United States Patent
Brown et al.

(10) Patent No.: US 6,643,093 B2
(45) Date of Patent: Nov. 4, 2003

(54) MAGNETIC RECORDING DEVICE WITH IMPROVED RELIABILITY

(75) Inventors: Charles Allan Brown, San Jose, CA (US); Richard Anthony DiPietro, Campbell, CA (US); Thomas Edward Karis, San Martin, CA (US); Herman Russell Wendt, San Jose, CA (US); Run-Han Wang, San Jose, CA (US)

(73) Assignee: Hitachi Global Storage Technologies Netherlands, B.V., Amsterdam (NL)

( * ) Notice: Subject to any disclaimer, the term of this patent is extended or adjusted under 35 U.S.C. 154(b) by 87 days.

(21) Appl. No.: 10/051,866

(22) Filed: Jan. 15, 2002

(65) Prior Publication Data

US 2003/0142438 A1 Jul. 31, 2003

(51) Int. Cl.[7] .............................................. G11B 17/02
(52) U.S. Cl. .................................................. 360/97.02
(58) Field of Search ........................... 360/97.02, 97.03

(56) References Cited

U.S. PATENT DOCUMENTS

| | | | | |
|---|---|---|---|---|
| 4,684,510 A | * | 8/1987 | Harkins ................... | 360/97.02 |
| 4,789,913 A | | 12/1988 | Gregory et al. .......... | 360/97.03 |
| 4,863,449 A | * | 9/1989 | Therriault et al. ........ | 360/97.02 |
| 5,023,738 A | | 6/1991 | Prenosil ...................... | 360/122 |
| 5,075,807 A | * | 12/1991 | Inoue et al. ................ | 360/97.02 |
| 5,229,899 A | | 7/1993 | Brown et al. ............. | 360/97.02 |
| 5,331,487 A | * | 7/1994 | Gregory et al. ........... | 360/97.02 |
| 5,344,589 A | | 9/1994 | Miksic et al. ............... | 252/392 |
| 5,447,695 A | * | 9/1995 | Brown et al. ............. | 360/97.02 |
| 5,715,945 A | | 2/1998 | Chandler .................. | 206/524.4 |
| 5,909,337 A | | 6/1999 | Tyndall, III ............... | 360/97.01 |
| 6,407,880 B1 | * | 6/2002 | Gillis et al. ............... | 360/97.02 |
| 6,433,957 B1 | * | 8/2002 | Rudd et al. ............... | 360/97.02 |

FOREIGN PATENT DOCUMENTS

JP        58-048278        3/1983        ........... G11B/25/04

* cited by examiner

Primary Examiner—Robert S. Tupper
(74) Attorney, Agent, or Firm—Lumen Intellectual Property Services, Inc.

(57) ABSTRACT

The magnetic surfaces of the magnetoresistive or magnetic tunnel junction and inductive write head and magnetic recording disk of a hard disk drive are protected from corrosion by inserting a vapor phase corrosion inhibitor (VPCI) package into the disk drive for providing additives in the vapor phase of the disk drive enclosure to maintain an equilibrium and renewable adsorbed film of metal passivators on the head and disk surfaces. The VPCI package includes at least one vapor phase corrosion inhibitor (VPCI) embedded in a polymeric matrix.

37 Claims, 5 Drawing Sheets

MAGNETIC RECORDING DEVICE WITH IMPROVED RELIABILITY

FIELD OF THE INVENTION

This invention relates generally to hard disk drives. More particularly, it relates to hard disk drives containing volatile organic compounds for corrosion protection.

BACKGROUND ART

Current growth rates for the digital magnetic recording data storage industry show an increase in recording densities of 60% per year. To continue at this growth rate, the recording industry is being forced to make a number of significant changes in the design of the magnetic recording devices. Digital magnetic recording devices, typically referred to as "hard" disk drives, for data storage generally include a thin film magnetic recording disk and a head or transducer which is moved along or above the surface of the rotating disk to read and write information on the disk. The decreasing bit cell size associated with increasing data and areal density requires increasing coercivity of the magnetic recording film to avoid thermal demagnetization and a smaller physical spacing between the head and the magnetic layer of the disk.

To accommodate these requirements, the magnetic materials in the head and the recording disk must be modified. The magnetic recording film on the disk typically contains Co and Cr. The magnetic recording head elements typically contain Ni—Fe alloy (permalloy), Ta, Cu, and Co. A giant magnetoresistive (GMR) or magnetic tunnel junction (MTJ) and inductive write head may contain materials such as Co, Cu, Ru, Ni Oxide, or XMn, where X can be Pt, Ni, or Ir. High moment write heads may contain alloys of Co, Fe and Ni. These metallic head and disk materials are susceptible to corrosion during storage or in use environments. The chemically reactive metals in current products are protected from corrosion by approximately 1–10 nm thick carbon overcoats. The overcoat thickness is continuously being reduced, or eventually to be eliminated, to decrease the physical spacing between head and disk, and to increase the areal recording density. In the absence of thin impermeable overcoats, water and other corrosive vapors are able to penetrate through pinholes of the porous carbon and any oxide layers on the reactive metal films and corrode the parts, thus rendering the disk and head element non-functional and unreliable.

The corrosion of unprotected metal films is determined by the composition of the vapor phase within the enclosure of the disk drive. Vapor phase composition can be controlled by a desiccant to maintain low humidity, adsorptive chemical filters to eliminate hydrocarbons and corrosive vapors (U.S. Pat. No. 5,229,899), and stringent quality control on the cleanliness and out-gassing of internal components through vacuum post-baking. Advanced material selection, vacuum post baking, and adsorptive chemical filters have practically eliminated uncontrolled vapor phase components in disk drives. However, even though the drive interior is extremely clean and dry, corrosion of sensitive reactive metal parts of the head and recording disk is still possible during exposure to harsh environmental conditions. For example, a TEM cross-section of a GMR head after 100 hours exposure at 120° C. and 93% relative humidity (RH) showed the disappearance of Co and Cu throughout the 0.5 micron thick stripe.

Japanese patent number JP58048278, issued to Yanagisawa on Mar. 22, 1983, discloses a magnetic recording device including a volatile corrosion inhibitor placed in a container for preventing corrosion of the magnetic disks. However, the volatile anti-corrosion agents, which includes iso-, di-, or triamine, their nitrites, benzoates, and carbonates, used in the Yanagisawa magnetic recording device are not effective in corrosion protection for metal alloys of the head and disk in current products.

U.S. Pat. No. 5,909,337, issued to Tyndall on Jun. 1, 1999, discloses a magnetic recording device having a liquid or solid volatile base for preventing the polymerization of gaseous contaminants at the head-disk interface. However, the volatile base of Tyndall cannot prevent the corrosion on the disk and head surface.

U.S. Pat. No. 5,023,738, issued to Prenosil on Jun. 11, 1991, discloses a magnetic recording head coated with a silane, zirconate or titanate compound to prevent atmospheric corrosion. However, Prenosil does not teach the protection of magnetic surfaces of recording disks of the hard disk drives from corrosion. These protective coatings are not applicable for coatings less than 2 nm thick required on future magnetic recording heads.

There is a need, therefore, for an improved magnetic recording device in which the magnetic surfaces of the recording disk and the GMR or MTJ and inductive write head are protected from corrosion.

SUMMARY

A hard disk drive (HDD) with a vapor phase corrosion inhibitor (VPCI) package for providing molecular level corrosion protection of the giant magnetoresistive (GMR) or magnetic tunnel junction (MTJ) and inductive write head and recording disk surfaces is described in an exemplary embodiment of the present invention. A hard disk drive typically includes a magnetic recording disk and a GMR or MTJ and inductive write head supported on a slider for magnetically reading or writing data from or to the magnetic recording disk. The slider is connected to an actuator for moving the head across the magnetic recording disk, which is moved relative to the head by a mechanism such as a motor. The disk drive is sealed in a housing with a VPCI package attached to an interior surface of the housing.

The VPCI package includes vapor phase corrosion inhibitor (VPCI) material embedded or dissolved in a polymeric matrix with the weight of the VPCI material in the range of 0.1% to 20% of the weight of the polymeric matrix. The polymeric matrix can be a thermoplastic polymeric matrix or an elastomer matrix. The VPCI package can be held inside the disk drive in many other ways, including deposited on a fibrous carrier or contained in a pouch with pinholes or labyrinth channels, for controlled release. The VPCI material is selected so as not to degrade the mechanical performance of the disk drive, and so as not to form particles inside the disk drive.

The VPCI material typically includes either one or a combination of a benzotriazole, a salt of a primary or secondary organic amine in combination with an organic acid, and an amine salt in combination with an inorganic acid. Specifically, the VPCI includes either one or a combination of 5-methyl benzotriazole, benzotriazole, butylated hydroxy toluene, di-tert-butyl benzoquinone, octafluoro hexanediol, and dicyclohexylammonium benzoate.

The components of the VPCI have sufficient vapor pressures to provide finite concentrations in the vapor phase and adsorbed films on the exposed surfaces of the magnetoresistive or magnetic tunnel junction and inductive write head and the recording disk. The vapor pressure is typically within $10^{-4}$ Pa to $10^3$ Pa between 20° C. and 100° C. Therefore, the vapor phase concentration of the VPCI components are selected to provide a predetermined adsorbed film thickness, which is typically between 0.1 nm and 5 nm. The maximum thickness of the adsorbed film is selected so as not to interfere with the physical spacing of the head flying over the disk.

The rate of the VPCI transferring from the VPCI package into the disk drive enclosure is controlled over the lifetime of the drive. The partial pressure of VPCI in the enclosure depends on the VPCI source term (the evaporation rate of the VPCI from the polymeric matrix), and the VPCI sink term (leaks and absorbers). The net VPCI evaporation rate, per unit area, of the VPCI package within the enclosure depends upon the solubility and diffusivity of the VPCI material in the polymeric matrix and the partial pressure of VPCI in the enclosure. Varying the area, composition, and thickness of the polymeric matrix can control the maximum evaporation rate of the VPCI from the VPCI package. These characteristics of the polymeric matrix can be controlled by altering the monomer, polymer chain length, crosslinking or melt processing of the polymeric matrix. The polymeric matrix can be made of polyolefin, such as polyethylene, polyurethane, polyamides, polyethers, and polyesters, or vinyl type polymers.

In a preferred embodiment, polyethylene is used to make the polymeric matrix. Polyethylene is a highly variable material, ranging from soft, highly branched, low density to stiff, linear, high density. Polyethylene can be extruded in thicknesses from 0.1 mm to 1 mm and can be co-extruded so that a film is produced with a stiff layer for strength and shape and a fusable layer for ease of sealing. The melted polyethylene with embedded VPCI can also be die cast into arbitrary flexible shapes, typically several mm thick and up to 1 cm or more in lateral dimension.

The VPCI may be present in powder or tablets of substantially pure VPCI material. The VPCI is preferably mixed with or impregnated in a porous material, such as silica gel, or in void volume spaces of a porous continuous material, such as thin flexible sheets made from fibers or filaments. The VPCI may fill in the interstitial spaces of a porous sintered material, such as glass, metal or plastic, or may be dissolved or dispersed in granules of polymeric material. A VPCI package may contain a single component, a mixture of components, or a mixture of various carriers with different components.

The polymeric matrix for packaging the VPCI may be present in a simple sealed bag. The polymeric matrix also can be a sealed bag with one stiff surface carrying a pressure sensitive adhesive or a cylinder or a box made of thick molded polymer and thin polymer, and the emission rate of the VPCI is controlled by the type and thickness of the polymer matrix. The polymer matrix also can be a package made of a polymer with low permeability and another polymer with high permeability.

Although the disk drive is sealed in a housing, a breather filter is preferably used for equilibrating the pressure within the disk drive enclosure with the external pressure. The breather filter for use with VPCI should contain at least one diffusion barrier to minimize loss of VPCI from the drive environment. Many breather filters contain carbon or other adsorptive materials. In this case, a diffusion barrier should be present between the adsorptive material and the drive interior to minimize adsorption of the VPCI. A diffusion barrier is a high aspect ratio channel through which a vapor must diffuse to pass from the inlet to the exit. The typical diffusion barrier channel is 10 mm long and has a cross-sectional area of 0.4 mm$^2$.

One type of corrosion takes place when adsorbed water and ions are present on the surfaces of the magnetoresistive or magnetic tunnel junction and inductive write head and the recording disk. The adsorbed water acts as an electrolyte, facilitating the migration of ions from regions of higher to lower electrochemical potential. One form of effective VPCI prevents the charge flow in the corrosion circuit, thereby eliminating the corrosion current.

The VPCI package also is held in an impermeable container punctured by one or more small pinholes for controlling the diffusion rate of the VPCI. In this embodiment, the delivery of the VPCI is metered by a diffusion channel, such as a small tube, or pinholes for controlling the diffusion rate of the VPCI.

It is therefore an object of the present invention to provide a hard disk drive having a VPCI package for preventing the corrosion of the metal films of GMR or MTJ and inductive write heads and magnetic recording disks with or without thin carbon overcoats, and other electrical interconnections of hard disk drives in normal or condensing humidity environments. Specifically, the VPCI package is advantageous for hard disk drives having self-burnishing sliders (so called self-limiting wear pad sliders) supporting GMR or MTJ and inductive write heads having no carbon overcoats.

DETAILED DESCRIPTION

Although the following detailed description contains many specifics for the purposes of illustration, anyone of ordinary skill in the art will appreciate that many variations and alterations to the following details are within the scope of the invention. Accordingly, the following preferred embodiment of the invention is set forth without any loss of generality to, and without imposing limitations upon, the claimed invention.

Vapor phase lubricant technology (U.S. Pat. No. 4,789, 913) has demonstrated that molecularly thin films of controlled thickness can be maintained on surfaces in the disk drive environment. The present invention fundamentally advances the state-of-art by providing vapor phase corrosion inhibitor (VPCI) to protect disk drive components. The present invention provides a molecular level corrosion protection by incorporating additives in the vapor phase of the disk drive enclosure to maintain a renewable film of metal passivators on the head and recording disk surfaces. The present invention is advantageous for disk drives having self-limiting wear contact pad sliders (also called self-burnishing sliders) supporting magnetic heads having thin or no carbon overcoat, or conventional contact sliders having worn carbon overcoats. A self-limiting wear contact pad slider includes a wearable pad surrounding a GMR or MTJ and inductive write head and positioned at the trailing end of the air bearing structure. When the slider and the disk are run together, the pad wears down by rubbing on the disk until the interference is zero. As a result, the GMR or MTJ and inductive write head metal elements with no carbon overcoat will be exposed to the atmosphere in the disk drive enclosure and be susceptible to corrosion.

Figure 1A:
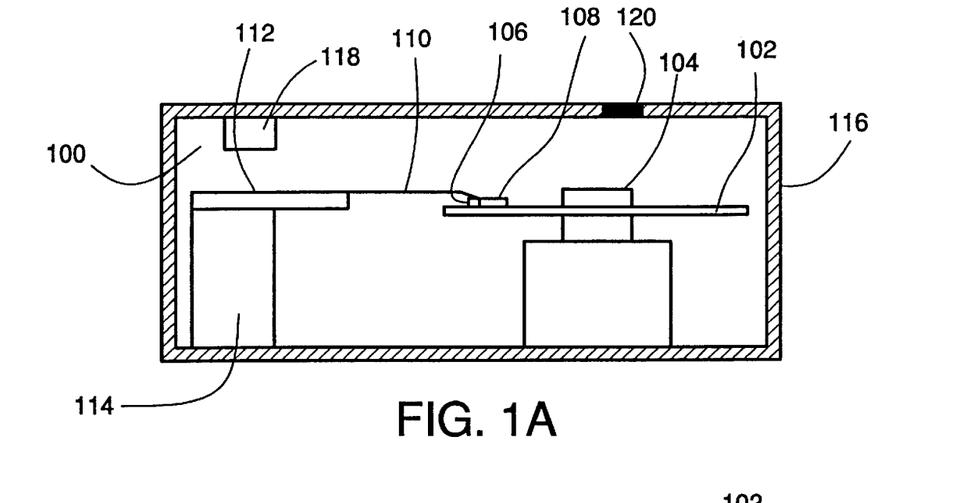
FIG. 1A is a cross-sectional view of a magnetic recording disk drive of the present invention.
Figure 1B:
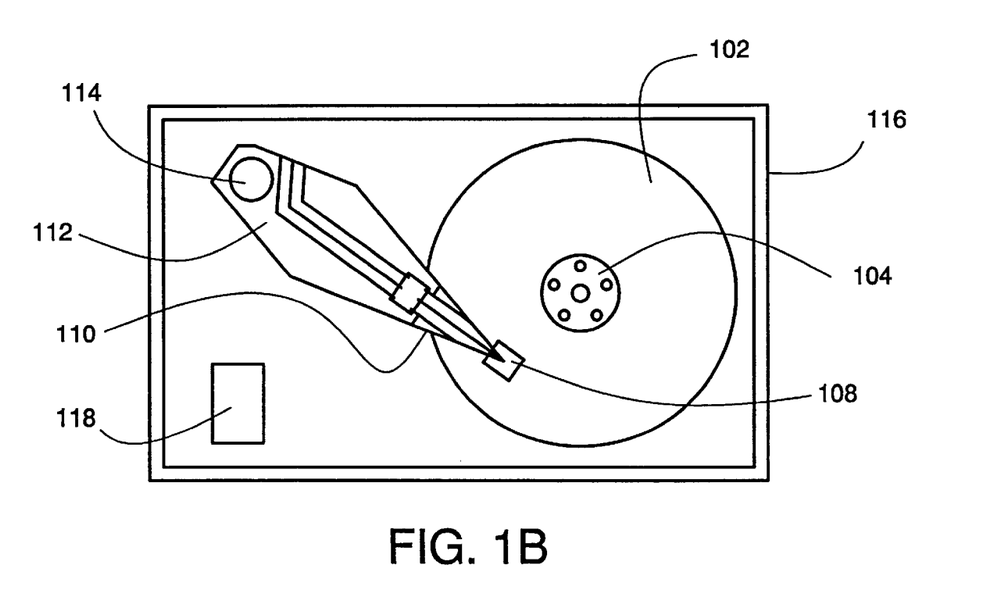
FIG. 1B is a top view of the magnetic recording disk drive of FIG. 1A.

In an exemplary embodiment of the present invention, a VPCI package is incorporated into a hard disk drive (HDD) to protect against the corrosion of the magnetoresistive or magnetic tunnel junction and inductive write head and the recording disk as shown in FIGS. 1A–B. FIGS. 1A and 1B are cross-sectional and top views, respectively, of a hard disk drive 100. Hard disk drive 100 includes a magnetic recording disk 102 including a substrate of glass, AlMg alloys or ceramic, a metallic magnetic layer, optionally a carbon overcoat, and a lubricant layer. Hard disk drive 100 further includes a magnetoresistive or magnetic tunnel junction and inductive write head 106 deposited on the trailing edge of a slider 108 for magnetically reading and writing data in the magnetic layer of the disk 102. The magnetoresistive or magnetic tunnel junction and inductive write head 106 and magnetic recording disk 102 are either coated with thin carbon overcoats of about 1 nm to 10 nm or without carbon overcoats. The magnetic recording disk 102 is rotated relative to the head 106 by a mechanism 104, such as a drive motor. The slider 108 is connected to a suspension 110 connected to an actuator 114 by means of a rigid arm 112. The whole structure is enclosed in housing 116. A vapor phase corrosion inhibitor (VPCI) package 118 is positioned on the inside top of the housing 116. Although the disk housing 116 is substantially sealed against ambient atmosphere, the disk drive preferably includes a breather filter 120 for equilibrating the pressure within the disk drive enclosure with the external pressure.

The VPCI package includes at least one vapor phase corrosion inhibitor (VPCI) embedded in a polymeric matrix with the weight of the VPCI in the range of 0.1% to 20% of the weight of the polymeric matrix. The polymeric matrix can be a thermoplastic polymeric matrix or an elastomer matrix. The VPCI is selected so as not to degrade the mechanical performance of the disk drive 100 and not to form particles inside the disk drive. The VPCI typically includes a triazole, such as benzotriazole, optionally carrying pendant groups such as tolyltriazole, or a salt of a primary or secondary amine with an organic acid, such as dicyclohexylammonium benzoate or isopropylcyclohexylammonium anisoate, and an amine salt in combination with an inorganic acid, such as dicyclohexylammonium nitrite. Specifically, VPCI includes 5-methyl benzotriazole, benzotriazole, butylated hydroxy toluene, di-tert-butyl benzoquinone, octafluoro hexanediol, dicyclohexylammonium benzoate, and their combinations. 5-methyl benzotriazole, benzotriazole, and dicyclohexylammonium benzoate are preferred materials.

The VPCI molecules emanate from the VPCI package to the vapor phase of the disk drive enclosure. The components of the VPCI have sufficient vapor pressures to provide finite concentrations in the vapor phase of the disk drive enclosure and adsorbed films on exposed surfaces of the head and the disk. The vapor pressure is typically within $10^{-4}$ Pa to $10^3$ Pa between 20° C. and 100° C. The thickness of the adsorbed film is determined by the vapor phase concentration of the VPCI and their adsorption isotherm. The adsorbed film thickness is typically between 0.1 nm and 5 nm, preferably 0.5 nm to 1 nm. Therefore, the VPCI components are selected to provide a predetermined adsorbed film thickness. The maximum thickness of the adsorbed film is selected so as not to interfere with the physical spacing of the head flying over the disk.

The rate of transport of VPCI from the VPCI package into the disk drive enclosure depends on the solubility (S) and the diffusion coefficient (D) of VPCI material in the polymeric matrix. The supply rate of the VPCI from the polymeric matrix thus depends on the surface area, composition, and thickness of the polymeric matrix. Therefore, the transfer rate of the VPCI from the VPCI package into the enclosure of the HDD can be controlled by altering monomer, polymer chain length, crosslinking, co-extrusion, or melt processing of the polymeric host matrix.

The polymeric matrix used for the VPCI package can produce a transfer rate of the VPCI sufficient to maintain adequate vapor concentration. Polyolefin materials, such as polyethylene (U.S. Pat. No. 5,344,589 ad U.S. Pat. No. 5,715,945), polyurethane, polyamides, polyethers, and polyesters allow reasonable transport rates of the VPCI from the interior of the VPCI package to the enclosure of the HDD. The material is preferably polyethylene because it is generally free of residual monomer and other low molecular weight impurities. Polyethylene is a highly variable material, ranging from soft, highly branched, low density to stiff, linear, high density. Polyethylene can be extruded in thicknesses from 0.1 mm to 1 mm and can be co-extruded so that a composite film is produced with a stiff layer for strength and shape and a fusable layer (e.g., ionomer polymers) for ease of sealing. Polyethylene containing embedded and/or dissolved VPCI can also be die cast or injection molded into arbitrary flexible shapes. The shapes can be preformed for direct attachment onto fixtures in the disk drive or machined to contain bolt holes or rivets. Alternatively, vinyl type polymers can be used.

The VPCI is optionally packed inside a polymeric matrix in the form of a simple sealed bag made of a thermoplastic polymeric matrix. The VPCI also is packed in a sealed polymer bag with one surface stiff and optionally carrying a pressure sensitive adhesive or in a cylinder or box of thick molded polymer with one or more "windows" of thin material, and the emission rate of the VPCI is controlled by the type and thickness of the polymeric matrix. The VPCI also is packed in a sealed container such as a package made from polymer with low permeability with one or more windows of polymer that are permeated by the VPCI component molecules. The VPCI package can be held in an impermeable container punctured with one or more small pinholes for controlling the diffusion rate of the VPCI. The VPCI can be released from the compartment through one or more pinholes through the impermeable walls. Additionally, the delivery of the VPCI is metered by a diffusion channel, such as a small tube, or pinholes to control the diffusion rate of the VPCI.

The VPCI comes in many different forms. It can be powder or tablets of substantially pure material. The VPCI can be mixed or impregnated in a porous material, such as silica gel. The VPCI also can be impregnated in the void volume spaces of a porous continuous material, such as thin flexible sheets made from fibers or filaments (e.g., paper, felt, spun bonded fabric). The VPCI can be substantially filled in the interstitial spaces of a porous sintered material, such as glass, metal, or plastic. The VPCI also can be dissolved or dispersed in granules of polymeric material.

A VPCI package may consist of a single VPCI, a mixture of VPCIs, or a mixture of various carriers with different VPCIs for different VPCI needs. For example, different VPCIs can be impregnated into sheets of thick paper, and two, three or more sheets with different VPCIs can packed in the sealed container.

Figure 2:
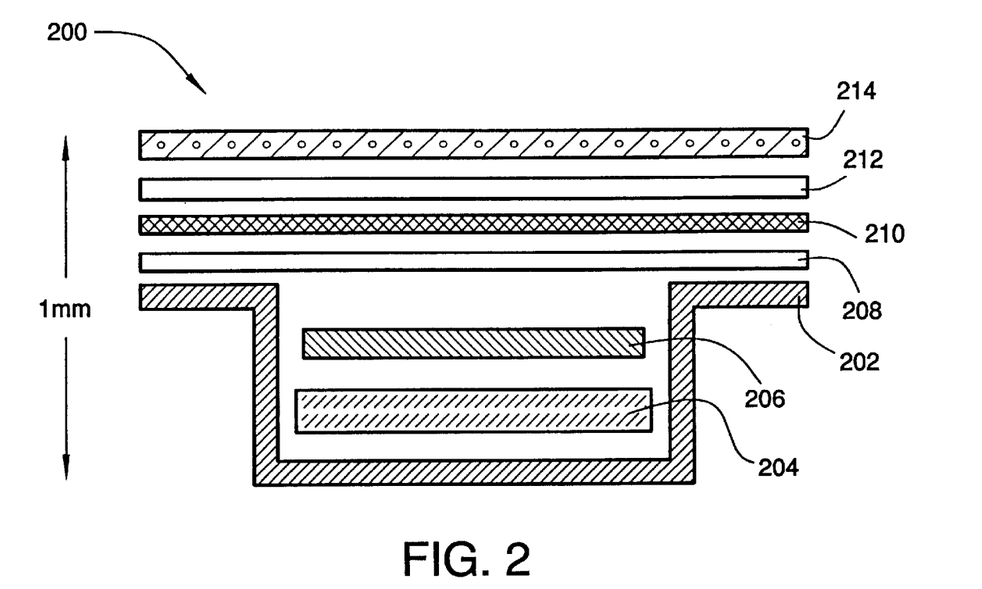
FIG. 2 is a cross-sectional view of a vapor phase corrosion inhibitor (VPCI) package.

FIG. 2 is a cross-sectional schematic diagram showing an example of the packaging of VPCIs. As shown in FIG. 2, a VPCI package 200 includes a porous EPTFE (Expanded Poly Tetra Flouro Ethylene) wrapper 202 enclosing a plastic film 204 impregnated with a first VPCI material (VPCI#1) and a porous fiberglass layer 206 impregnated with a second VPCI material (VPCI#2). Wrapper layer 202 is sealed with a first adhesive film 208 contacting a carrier film 210 for producing a stiff surface. The carrier film is made from materials such as polyester (e.g., polyethylene terphthalate), polycarbonate, polyacrylate, or similar structural thermoplastics. The thickness of the VPCI package is typically about 1 mm in order to fit inside the drive enclosure. VPCI package 200 is attached to an inside surface 214 of a disk drive enclosure through a second adhesive film 212.

Alternatively, the package may have wrapper layer 202 replaced by a film of material capable of slow diffusive passage of the VPCI material(s), and plastic film layer 204 may be replaced by a porous fiberglass layer impregnated with the first VPCI material.

An example of a VPCI package is Zerust Plastabs (i.e., plastic tabs) available from Northern Technologies International Corporation, Minnesota. Zerust Plastabs include VPCI components packed in an extruded high density polyethylene matrix. Some of the Zerust Plastabs are about 1 mm thick and are available in 0.5×0.5, 0.75×0.75, or 1×1 inch squares, which are suitable for application in the disk drive enclosure. Zerust Plastabs contain many derivatives of di-t-butyl-2,5-cyclohexadiene-1,4-dione, aliphatic amines, and derivatives of butylated hydroxy toluene (BHT). Based on thermal analysis and gas chromatography with mass spectroscometry (GC/MS) characterization of the trapped volatiles, the Zerust Plastab contains about 0.3–0.4% by weight of VPCI components.

VapPro is a VPCI, and one kind of VapPro is in white powder form of VPCI coated on silica particles as a carrier. VapPro is available from Magna Chemical Canada Inc. VapPro contains volatile compounds of benzotriazole, such as 5-methyl benzotriazole, and nitrite salt of dicyclohexyl amine with a molar mass ratio of 2.8:1 and a non-volatile inorganic compound such as silica gel. Based on thermal analysis and GC/MS characterization of the trapped volatiles, this form of VapPro contains about 30% by weight of VPCI components. VapPro is deliquescent at 50° C. and 96% relative humidity (RH), which renders it ineffective for inhibiting corrosion at these conditions.

An example of a method for packaging VPCI in a medium density polyethylene wax (MDPE) is as follows. 0.5 gram of VPCI material was ground using a mortar and pestle. Six grams of MDPE was melted at 110° C., 0.24 grams of ground VPCI material was stirred in the melted MDPE, and the mixture was cooled rapidly by pouring onto a cold metal plate. The cooled mixture was wiped with isopropyl alcohol and stored in a sealed jar.

Figure 3:
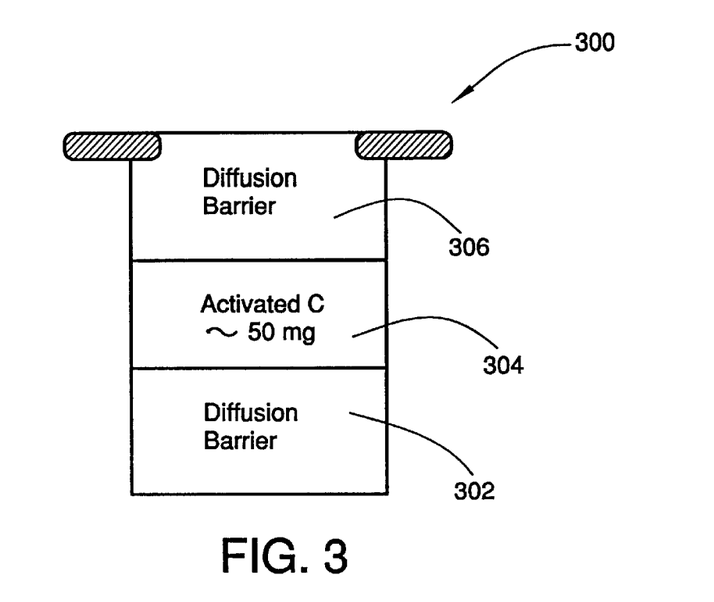
FIG. 3 is a cross-sectional view of a breather filter suitable for use with the present invention.

FIG. 3 is a cross-sectional schematic diagram illustrating a preferred breather filter 300 used in a disk drive of the present invention. The breather filter 300 includes about 50 mg of activated carbon 304 sandwiched between two diffusion barriers 302 and 306. A diffusion barrier is a high aspect ratio channel through which a vapor must diffuse to pass from the inlet to the exit. The typical diffusion barrier channel is 10 mm long and has a cross-sectional area of 0.4 $mm^2$. The activated carbon is impregnated with an alkali metal carbonate to enhance trapping of acid gases. The diffusion barrier 302 faces the disk to reduce the absorption of VPCI by the activated carbon 304, so that VPCI levels are maintained for preventing corrosion of the magnetic head and the magnetic disk over the lifetime of the disk drive.

One form of corrosion takes place when adsorbed water and ions are present on metallic surfaces. The adsorbed water acts as an electrolyte that facilitates the migration of ions from regions of higher electrochemical potential to regions of lower electrochemical potential. An effective VPCI may act to prevent the charge flow that forms the corrosion circuit, thereby eliminating the corrosion current. Another mechanism of VPCI protection may be to prevent water adsorption and/or condensation onto metallic surfaces. Still another action of VPCI may be to provide a barrier film between water electrolyte and metallic surfaces.

Several tests were done to verify the transfer of VPCI from a VPCI package to a nearby surface, and the compatibility of the VPCI with the head disk interface. Tests also were done to determine the effectiveness of the VPCI in preventing corrosion of metal films, GMR or MTJ and inductive write head rows and hard disk drives at elevated temperature and humidity. The following examples describe specific implementations of the present invention. The details below fall within the scope of, and serve to exemplify, the more generally described invention set forth above. The examples are presented for illustrative purposes only, and are not intended as a restriction on the scope of the invention.

EXAMPLE 1

Figure 4:
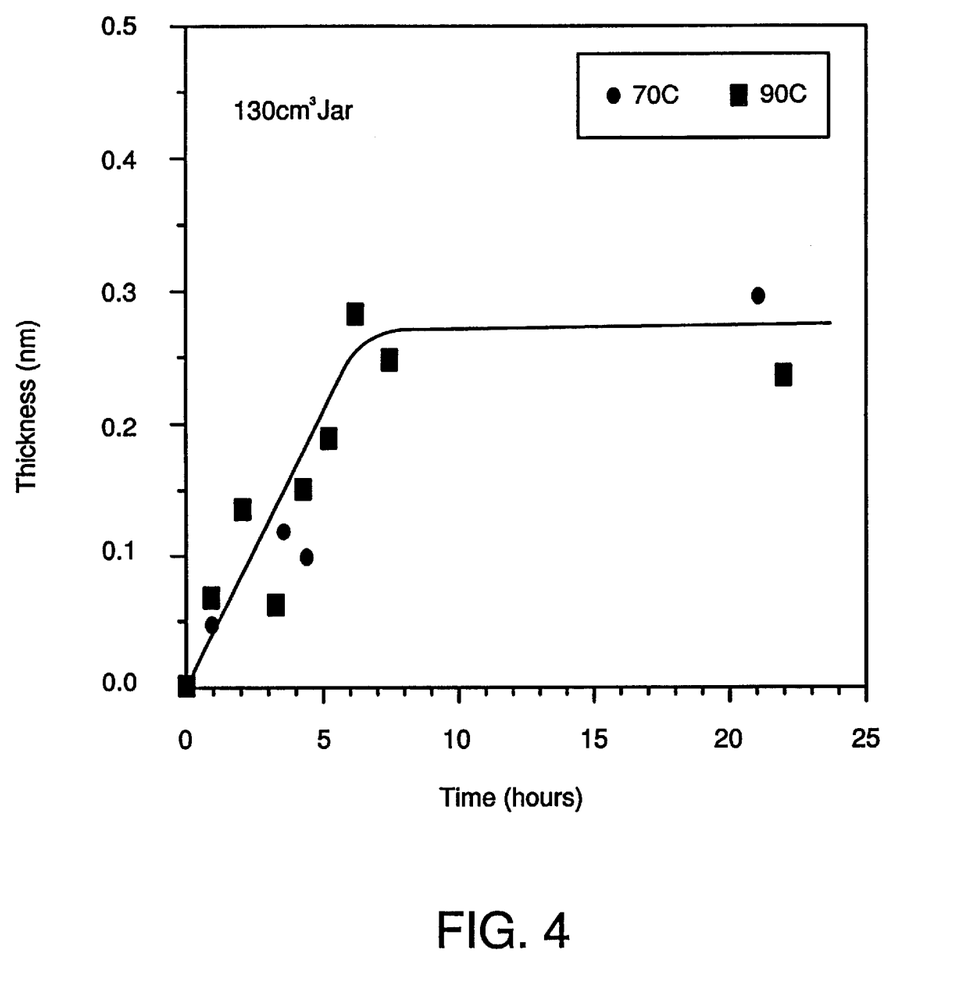
FIG. 4 is a graph illustrating the rate of volatile corrosion inhibitor transfer from Zerust Plastab to a silicon wafer.

A test system was constructed to verify the transfer of VPCI from a Zerust Plastab onto nearby surfaces at a constant temperature. A silicon wafer and a 1×1 inch Zerust Plastab were sealed in a 130 $cm^3$ pre-cleaned glass jar with a Teflon lined cap (VWR 15900-152). The jar was placed in an oven for maintaining a constant temperature. The anticorrosion film thickness on the silicon wafer was periodically measured by ellipsometry. FIG. 4 is a graph of film thickness versus time at temperatures of 70° C. and 90° C., with the film thickness calculated using a refractive index n of 1.5. As shown in FIG. 4, the film thickness increased in the first seven hours. After that, the film thickness was unchanged. The equilibrium film thickness was between 0.2 nm and 0.3 nm, which is less than the head flying height, and about 20% of the disk lubricant thickness.

EXAMPLE 2

Test systems were also constructed to verify the compatibility of the VPCI with the head disk interface. The test systems included disk drives with magnetoresistive or magnetic tunnel junction and inductive write heads and Zerust Plastabs inserted into the drives. The drives were run for one week at 75° C. while monitoring generalized error measurements (GEM) and error rates. The drives were also run in daily temperature cycling, between ambient temperature and 75° C. for one week. The drives were also run with fast seeks at 100 operations per second (ops) for one week. The drives also were run at sub-ambient pressure, equivalent to an altitude of 10,000 feet, for 1 week. For all runs, no new hard error rates (HER) were observed, and the soft error rates (SER) were unchanged, demonstrating that the presence of the VPCI does not degrade the performance of the disk drive.

EXAMPLE 3

Test systems were constructed to verify the corrosion protection ability of the VPCI. A glass coupon with a metal film deposited by RF sputtering and a Zerust Plastab were sealed in a pre-cleaned jar with a Teflon lined cap (VWR 15900-152). The metal film was pretreated by exposure to VPCI. The jar was placed in an oven overnight at 50° C. A saturated aqueous solution of potassium sulfate was added in the bottom of the jar to control the relative humidity, and the jar was placed in the oven at 50° C. Sheet resistance of the metal film was periodically measured. The sheet resistance measurements were also done identically but without the Zerust Plastab present in the jar for a comparison. Table 1 below shows the corrosion test of thin metal film samples with VPCI at 50° C. and 95% RH. Sheet resistance was measured to within +/−1.5%.

TABLE 1

Metal film coupon test results on Zerust with sheet resistance and optical microscopy measurement.

| | | Exposure | Sheet Resistance (ohms/square) | | |
|---|---|---|---|---|---|
| Sample | Plastab | (days) | Before | After | Appearance |
| 100 nm RF Cu | No | 3 | 0.39 | 22.9 | Heavy Corrosion |
| | Yes | 7 | 0.39 | 0.37 | Shiny |
| 100 nm RF Co | No | 3 | 1.27 | 1.8 | Corrosion |
| | Yes | 7 | 1.27 | 1.29 | Shiny |
| 100 nm RF NiMn | No | 1 | 18.79 | 34.7 | Heavy Corrosion |
| | Yes | 5 | 18.8 | 19.5 285–338 | 2/3 Shiny 1/3 Corrosion |
| 500 nm Plated NiFe 80/20 | No | 4 | 0.46 | 0.48 | Shiny |
| | Yes | 3 | 0.46 | 0.453 | Shiny |
| 500 nm Plated NiFe 45/55 | No | 4 | 0.92 | 0.94 | Shiny |
| | Yes | 3 | 1.005 | 1.000 | Mild Corrosion |

The test results in Table 1 show that the volatile corrosion inhibitor prevented humidity corrosion of Cu and Co and reduced humidity corrosion of NiMn. Mild corrosion on the NiFe 45/55 (i.e., 45 weight % of Ni and 55 weight % of Fe) in the presence of the Plastab may have been due to surface contamination. However, VPCI in the Plastab did not significantly reduce the humidity corrosion of NiMn. NiFe 80/20 (i.e., 80 weight % of Ni and 20 weight % of Fe) did not corrode in the absence of Zerust. Therefore, the VPCI in the Zerust Plastab effectively prevents corrosion on some of the metals used in the disk drives. However, a different set of improved anti-corrosion additive components are required to prevent corrosion on the other metals of the recording head and disk.

EXAMPLE 4

Test systems were constructed with disk drives to verify the corrosion protection ability of Zerust Plastabs. The test systems included disk drives containing giant magnetoresistive read heads and inductive write heads having diamond-like carbon (DLC) overcoats with Zerust Plastabs inserted into the disk drives. Table 2 below shows the corrosion tests of these disk drives with and without Zerust Plastabs VPCI.

TABLE 2

HDD test results on Zerust with amplitude measurement.

| VPCI | DLC (nm) | Cycle | T (° C.) | RH % | Ramp down | # disk drives | # disk drives failed | # head | % low ampl head |
|---|---|---|---|---|---|---|---|---|---|
| Yes | 4 | 1 wk | 50 | 90 | 3.5 days | 5 | 0 | 10 | 0 |
| No | 4 | 1 wk | 50 | 90 | 3.5 days | 20 | 5 | 40 | 22.5 |

The test results in Table 2 show that the Zerust prevented humidity corrosion of the heads in these disk drives in the normal non-condensing environment with slow ramp down of relative humidity (RH). However, Zerust was ineffective in preventing corrosion with rapid ramp down in the cycling with condensing humidity.

EXAMPLE 5

Test systems were constructed with disk drives, each of which included 20 heads, to verify the corrosion protection ability of Zerust Plastabs. Four of the disk drives, each of which included a breather hole filter and a recirculation filter with activated carbon, but without a desiccant, were tested for MR resistance (MRR), amplitude, hard error rate (HER) and soft error rate (SER). Two of the disk drives contained Zerust Plastabs, and the others did not contain Zerust Plastabs. First the disk drives were tested at 50° C. and 90% RH for three weeks. After that, the disk drives were tested for three more weeks at 65° C. and 90% RH. MR resistance, amplitude, HER and SER were measured after one week, three weeks and six weeks. Two more of the same type of the disk drives, each of which included 20 heads, were tested for mean square error (MSE) at 65° C. and 90% RH for six weeks. One disk drive was tested with a Zerust Plastab, and the other was tested without a Zerust Plastab. The test results are shown in Table 3 below.

TABLE 3

HDD test results on Zerust with error rate measurement. Some of the test cells after 6 and 13.5 weeks are missing due to drive electronics failure.

| VPCI | Disk drive Number | 50° C./90% 1 wk | 50° C./90% 3 wks | 65° C./90% 6 wks | 65° C./90% 13.5 wks |
|---|---|---|---|---|---|
| No | 1 | No new HER | No new HER | No new HER | 4 heads high |
| No | 2 | No new HER | No new HER | — | — |
| Zerust | 3 | No new HER | No new HER | No new HER | — |
| Zerust | 4 | No new HER | No new HER | No new HER | No change |
| No | 5 | Not applicable | Not applicable | MSE increase | Not measured |
| Zerust | 6 | Not applicable | Not applicable | No change in MSE | 1 head high |

The results from Table 3 show that no new hard error rates were observed in disk drives 1 through 4 after three weeks of testing. The MSE of drive 6 was unchanged after six weeks. The MSE and MRR in six heads of drive 5 increased after three weeks. Furthermore, in drive 2, the MRR of one head was 13 Ohms. The MRR of another head was 219 Ohms, and there was no signal in this head. The soft error rate was also high in one head of drive 2. After 13.5 weeks of testing at 65° C./90% RH, there was no increase in HER in drive 4 with VPCI, while four heads exhibited a HER increase in drive 1 without VPCI. An increase in the MR resistance accompanied the increase HER or MSE. Optical microscopy revealed smears on the air bearing surface of many sliders from the drive without VPCI. There were fewer smears on the air bearing surfaces of sliders in the drives with VPCI present. In this type of test, smears on the air bearing surface have been identified with corrosion products picked up from the disk.

EXAMPLE 6

Test systems were constructed to verify the efficacy of VPCI combining Zerust and VapPro in corrosion protection on thin films at 50° C. and 90% RH for a week compared with other VPCIs, such as Uniwrap, Cobratec 928, ZDPA, and Cortec 307. Uniwrap (available from Daubert VCI, Inc., Illinois) includes aromatic IBM hydrocarbon, alkyl metal nitrate, and alkyl benzotriazole impregnated in paper. ZDPA is a low molecular weight (about 700 to 1,000 daltons) linear copolymer of perfluoromethylene and perfluoroethylene oxide with dipropylamino end groups. Cobratec 928 (available from PMC Specialties Group, Inc.) includes a modified triazole in water solution. Cortec 307 (available from KPR Adcor Inc., New York) includes ethanolammonium benzoate, cyclohexylammonium benzoate, 5-methyl benzotriazole, cyclohexylammonium nitrate, and their derivatives. The test results are shown in Table 4 below.

TABLE 4

Metal film coupon test results comparing the effectiveness of several VPCI. Empty cells indicated that the test cell was not run.

| Material | No VPCI | Zerust | VapPro | Zerust + VapPro | UniWrap | Cobratec 928 | ZDPA | Cortec 307 |
|---|---|---|---|---|---|---|---|---|
| Cu 100 nm | corroded | yes | yes | yes | yes | yes | no | yes |
| Co 100 nm | corroded | yes | no | yes | no | no | no | no |
| Co/Cu 20/20 nm | corroded | — | no | yes | — | | — | |
| $Co_{90}Fe_{10}$ 100 nm | corroded | no | yes | yes | no | | — | |
| NiMn 100 nm | corroded | no | better | yes | no | no | no | better |
| PtMn 100 nm | clean | clean | clean | clean | — | | clean | — |
| IrMn 100 nm | corroded | — | | yes | — | | | yes |
| $Ni_{45}Fe_{55}$ 0.5 μm | clean | | clean | | — | | clean | |
| $Ni_{81}Fe_{19}$ 0.5 μm | clean | clean | | — | | | | |

"yes": VPCI is effective in inhibiting corrosion;
"no": VPCI is ineffective in inhibiting corrosion.
"clean": control did not corrode.

The results in Table 4 show that a combination of Zerust and VapPro is effective in inhibiting corrosion for most of the metal films at the above test conditions.

EXAMPLE 7

Rows of heads without carbon overcoats were tested to verify the corrosion protection of VPCI formulations denoted IBM#6, IBM#7, and IBM#8. IBM#6 includes 5-methyl benzotriazole, benzotriazole, butylated hydroxy toluene, and di-tert-butyl benzoquinone with 1% by weight of each in medium density polyethylene (MDPE). IBM#7 includes 5-methyl benzotriazole and benzotriazole with 2% by weight of each in medium density polyethylene (MDPE). IBM#8 includes benzotriazole and dicyclohexyl ammonium benzoate with 2% by weight of each in medium density polyethylene (MDPE). The tests were done for heads with and without VPCI packages, and the MR resistances (MRR) of the heads were measured to determine the percentage of heads with MRR increases of 1 ohm and 5 ohms at 65° C. and 100% RH after 1 week. The test results are shown in Table 5 below.

TABLE 5

MRR and SEM measurements on head rows after treatment with specially formulated VPCI. Heads damaged by electrostatic discharge (ESD) were excluded from consideration.

|  | With IBM #6 | Without IBM #6 | With IBM #7 | Without IBM #7 | With IBM #8 | Without IBM #8 |
|---|---|---|---|---|---|---|
| # initially good heads | 282 | 293 | 261 | 223 | 491 | 465 |
| # head with dR ≥ 1 ohm | 2 2-ESD | 13 1-ESD | 2 | 7 | 1 | 27 |
| % heads with dR ≥ 1 ohm | 0.0% | 4.1% | 0.8% | 3.6% | 0.2% | 5.8% |
| Corrosion* in head with dR > 1 ohm | 0 out of 5 corroded | 5 out of 5 corroded | 1 out of 2 corroded | 4 out of 4 corroded | 0 out of 1 not corroded | 5 out of 5 corroded |
| Corrosion* in head with dR < 1 ohm | 1 out of 7 corroded | 2 out of 6 corroded | 0 out of 4 corroded | 0 out of 4 corroded | 2 out of 5 corroded | 3 out of 4 corroded |

Where * showed number of heads corroded out of number heads examined by scanning electron microscopy (SEM.

The results in Table 5 show that the heads treated with VPCI had significantly less corrosion than those without VPCI treatment. Specifically, for heads with MRR increasing more than 1 ohm, all 14 out of 14 heads without VPCI that were examined by SEM had corroded, while only one head treated with VPCI had corroded. For heads with MRR increasing less than 1 ohm, 5 out of 14 heads without VPCI had corroded, and 2 out of 16 heads with VPCI had corroded.

EXAMPLE 8

Figure 5:
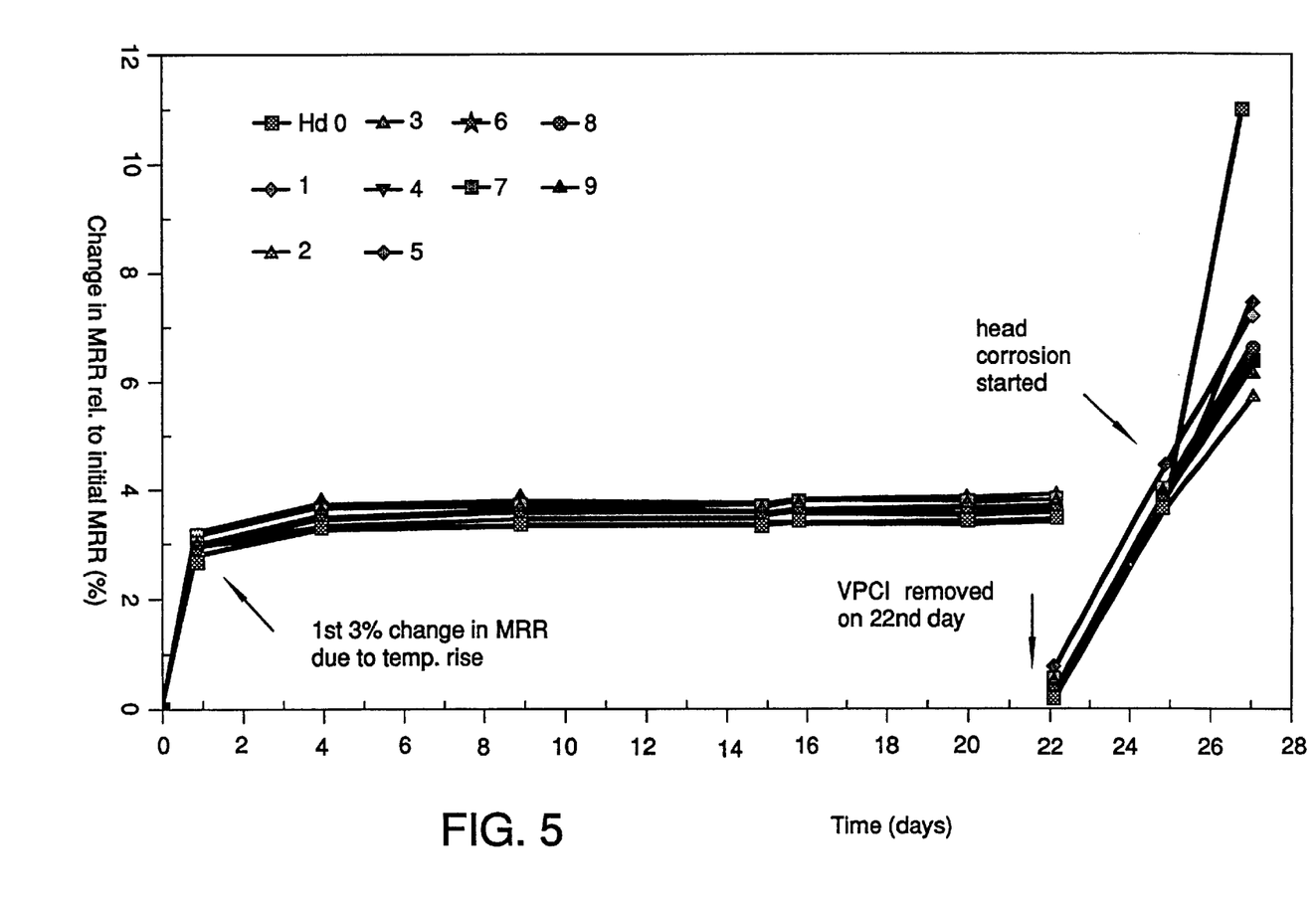
FIG. 5 is a graph illustrating the change in MR resistance with time for a self-limiting wear pad in a disk drive with Cortec 133 after the protective carbon overcoat is burnished away.

Test systems were constructed to measure the change in MRR, relative to initial MRR, with time in disk drives including self-limiting wear padded sliders and Cortec 133 VPCI placed inside the-disk drive. Measurements were performed at 50° C., and 90% RH after 7 nm of carbon overcoat and approximately 13 nm of MR stripe was burnished away. Cortec 133 (available from KPR Adcor Inc., New York) typically contains ethanolammonium benzoate, cyclohexylammonium benzoate, 5-methyl benzotriazole and their derivatives. The disk drive included ten heads, a breather filter, a recirculation filter, and no desiccant. The test results are illustrated in FIG. 5 showing a graph of the MRR change for each of the ten heads in the disk drive. The MRR increased 3% in the first day due to the temperature increase. The MRR increased slowly to 3.5% from the second day to the fourth day, and remained unchanged until the VPCI was removed on the 22$^{nd}$ day. Head corrosion started when the VPCI was removed, causing the MRR to rapidly increase about 6% in three days.

EXAMPLE 9

Figure 6:
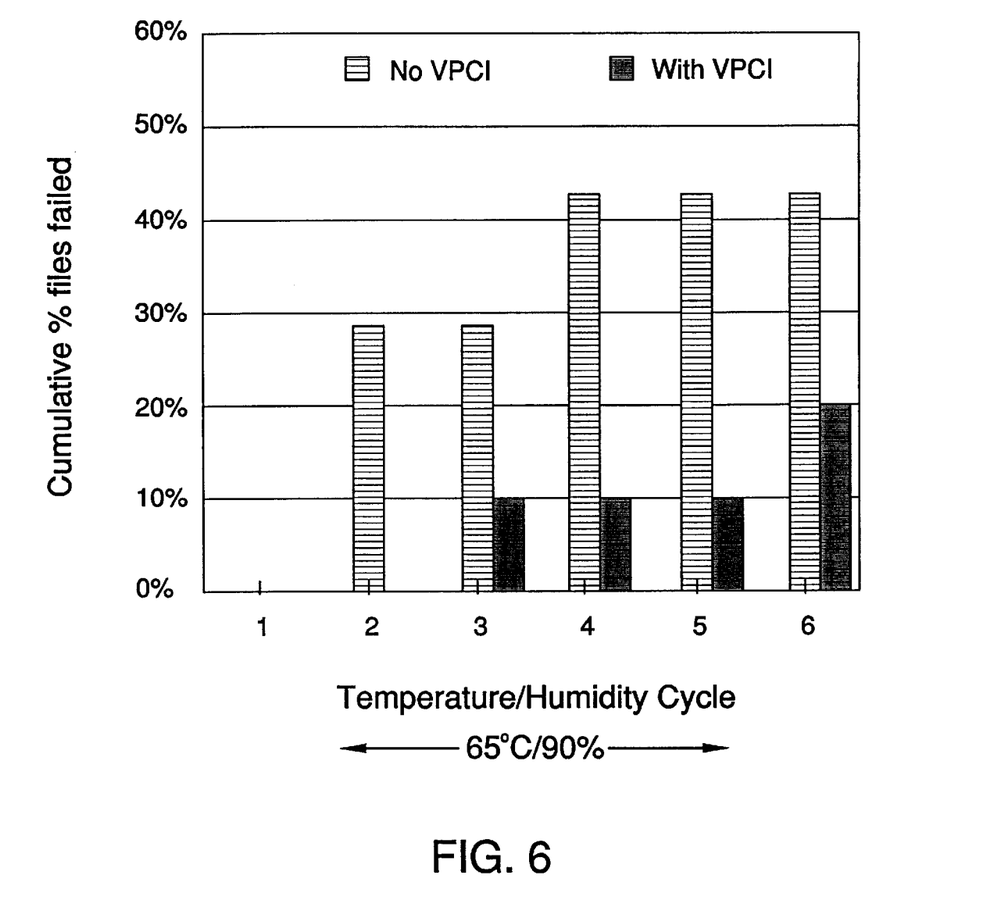
FIG. 6 is a graph illustrating the cumulative percent of failed disk drives versus temperature/humidity (T/H) Cycle for disk drives with and without VPCI.

Test systems were constructed to verify the corrosion protection ability of VPCI including Zerust and Cortec 132 in disk drives. Cortec 132 (available from KPR Adcor Inc., New York) contains similar materials but different volatility and vapor pressure from Cortec 133. The tests were done on disk drives with and without VPCI for comparison. Test results are shown in the graph of FIG. 6, which illustrates the cumulative percent of the disk drives that failed versus T/H (temperature/humidity) cycle, in which cycle #1 was done at 50° C. and 90% RH for 3 weeks in a non-condensing-environment, and each of cycles #2 through cycle #6 was done in a condensing environment, after 65° C. and 90% RH for three days. No drives failed in Cycle #1. About 30% of drives without VPCI failed, and no drives with VPCI failed, in cycle #2. In cycle #3, 10% of the drives with VPCI failed. The percentage of drives with VPCI that failed remained constant at 10% in cycles #4 and #5, and 42% of the drives without VPCI failed. In cycle #6, the cumulative percentage of drives without VPCI that failed was constant (42%), but the cumulative percentage of drives with VPCI that failed was only 20%.

It will be clear to one skilled in the art that the above embodiment may be altered in many ways without departing from the scope of the invention. Accordingly, the scope of the invention should be determined by the following claims and their legal equivalents.

What is claimed is:

1. A disk drive comprising:
   a) a magnetic recording disk;
   b) a magnetoresistive or magnetic tunnel junction and inductive write head supported on a slider for magnetically reading data to or magnetically writing data from the magnetic recording disk;
   c) an actuator connected to the slider for moving the magnetoresistive or magnetic tunnel junction and inductive write head across the magnetic recording disk;

d) a mechanism for moving the magnetic recording disk relative to the magnetoresistive or magnetic tunnel junction and inductive write head; and e) a corrosion inhibitor package comprising at least one vapor phase corrosion inhibitor embedded in a polymeric matrix.

2. The disk drive of claim 1, wherein the polymeric matrix is selected from the group consisting of thermoplastic polymeric matrix and elastomer matrix.

3. The disk drive of claim 1, wherein the weight of the vapor phase corrosion inhibitor is in the range of 0.1% to 20% of the weight of the polymeric matrix.

4. The disk drive of claim 1, wherein the vapor phase corrosion inhibitor is selected so as not to degrade the mechanical performance of the disk drive.

5. The disk drive of claim 1, wherein the vapor phase corrosion inhibitor is selected so as not to form particles on the interior surfaces of the disk drive.

6. The disk drive of claim 1, wherein the vapor phase corrosion inhibitor comprises at least one material selected from the group consisting of triazole, an amine salt in combination with an organic acid, and an amine salt in combination with an inorganic acid.

7. The disk drive of claim 6, wherein the vapor phase corrosion inhibitor comprises at least one material selected from the group consisting of 5-methyl benzotriazole, benzotriazole, butylated hydroxy toluene, di-tert-butyl benzoquinone, octafluoro hexanediol, dicyclohexyl ammonium benzoate, and dicyclohexylammonium nitrite.

8. The disk drive of claim 1, wherein components of the vapor phase corrosion inhibitor have sufficient vapor pressures to provide adsorbed films on exposed surfaces of the magnetic recording disk and the magnetoresistive or magnetic tunnel junction and inductive write head.

9. The disk drive of claim 8, wherein the vapor phase concentrations of the vapor phase corrosion inhibitor components are selected to provide a predetermined adsorbed film thickness.

10. The disk drive of claim 9, wherein the thickness of the adsorbed film is between 0.1 nm and 5 nm.

11. The disk drive of claim 1, wherein the area, composition and thickness of the polymeric matrix are selected to control the rate of transfer of the vapor phase corrosion inhibitor from the corrosion inhibitor package to a disk drive enclosure.

12. The disk drive of claim 11, wherein the transfer rate of the vapor phase corrosion inhibitor depends on its solubility and diffusivity in the polymeric matrix.

13. The disk drive of claim 12, wherein the solubility and the diffusivity of the vapor phase corrosion inhibitor depends on the monomer, polymer chain length, crosslinking, and melt processing of the polymeric matrix.

14. The disk drive of claim 1 further comprising a breather filter for equilibrating a pressure within a disk drive enclosure with an external pressure.

15. The disk drive of claim 14, wherein the breather filter comprises activated carbon adjacent to at least one diffusion barrier.

16. The disk drive of claim 1, wherein the polymeric matrix comprises a polymer selected from the group consisting of polyolefin and vinyl type polymers.

17. The disk drive of claim 16, wherein the polyolefin comprises polyethylene, polyurethane, polyamides, polyethers and polyesters.

18. The disk drive of claim 1, wherein the vapor phase corrosion inhibitor is present in a substantially pure material form.

19. The disk drive of claim 18, wherein the vapor phase corrosion inhibitor is in a powder form.

20. The disk drive of claim 18, wherein the vapor phase corrosion inhibitor is in a tablet form.

21. The disk drive of claim 1, wherein the vapor phase corrosion inhibitor is impregnated in void volume spaces of a porous material.

22. The disk drive of claim 21, wherein the porous material comprises thin flexible sheets made from a material selected from the group consisting of fibers and filaments.

23. The disk drive of claim 1, wherein the vapor phase corrosion inhibitor is filled in the interstitial spaces of a porous sintered material selected from the group consisting of glass, ceramic, metal, and plastic.

24. The disk drive of claim 1, wherein the vapor phase corrosion inhibitor is dissolved in granules of a polymeric material.

25. The disk drive of claim 1, wherein the polymeric matrix is a simple sealed bag.

26. The disk drive of claim 1, wherein the polymeric matrix is a sealed bag with one stiff surface carrying a pressure sensitive adhesive.

27. The disk drive of claim 25, wherein an emission rate of the vapor phase corrosion inhibitor from the sealed bag is controlled by the type and thickness of the polymeric matrix.

28. The disk drive of claim 1, wherein the polymeric matrix is a cylinder or box of thick molded polymer and thin polymer.

29. The disk drive of claim 28, wherein an emission rate of vapor phase corrosion inhibitor from the sealed bag is controlled by the type and thickness of the thermoplastic polymeric matrix.

30. The disk drive of claim 1, wherein the polymeric matrix is a package made from a polymer with low permeability and a polymer with high permeability.

31. The disk drive of claim 1, wherein the corrosion inhibitor package is held in an impermeable container punctured by at least one small pinhole for controlling the diffusion rate of the vapor phase corrosion inhibitor.

32. The disk drive of claim 1, wherein a delivery of the vapor phase corrosion inhibitor is metered by a diffusion channel.

33. The disk drive of claim 1, wherein the slider is a self-limiting wear contact pad slider.

34. The disk drive of claim 1, wherein the slider is a conventional contact recording slider.

35. The disk drive of claim 1, wherein a protective overcoat on the slider is insufficient for preventing head corrosion.

36. The disk drive of claim 1, wherein a protective overcoat on the magnetic recording disk is absent.

37. The disk drive of claim 1, wherein a protective overcoat on the magnetic recording disk is insufficient for preventing disk corrosion.

* * * * *